(12) United States Patent
Howe et al.

(10) Patent No.: US 7,531,034 B2
(45) Date of Patent: May 12, 2009

(54) METAL-PHOSPHATE BINDERS

(75) Inventors: Beth Ann Howe, Lewistown, IL (US); Jesus Guadalupe Chaps-Cabrera, Coahuila (MX)

(73) Assignee: Caterpillar Inc., Peoria, IL (US)

( * ) Notice: Subject to any disclaimer, the term of this patent is extended or adjusted under 35 U.S.C. 154(b) by 621 days.

(21) Appl. No.: 11/142,530

(22) Filed: May 31, 2005

(65) Prior Publication Data
US 2006/0266264 A1 Nov. 30, 2006

(51) Int. Cl.
*C04B 12/02* (2006.01)

(52) U.S. Cl. .................................... 106/691

(58) Field of Classification Search .................. 106/691
See application file for complete search history.

(56) References Cited

U.S. PATENT DOCUMENTS

| | | | |
|---|---|---|---|
| 5,620,645 A | 4/1997 | Crumpacker et al. |
| 5,863,481 A | 1/1999 | Crumpacker et al. |
| 6,036,762 A | 3/2000 | Sambasivan |
| 6,461,415 B1 | 10/2002 | Sambasivan et al. |
| 6,743,380 B2 | 6/2004 | Kelley et al. |
| 2004/0138058 A1 | 7/2004 | Sambasivan et al. |

FOREIGN PATENT DOCUMENTS

GB   1406233   9/1975

OTHER PUBLICATIONS

Ryzhkov, I.: "Raw-material mix for producing phosphate binder." Chemical Abstracts & Indexes, American Chemical Society, Columbus, U.S., vol. 99 #2, Jul. 11, 1983, p. 251, XP000189178 & SU 992,476 of Jan. 30, 1983.
Kopeikin, V.A.: "Mineral Adhesive," Chemical Abstracts & Indexes, American Chemical Society, Columbus, U.S., vol. 96 #22, May 31, 1982, p. 344.
Database WPI, Section Ch. Week 199641, Derwent Publications Ltd., London, GB: AN 1996-410921 & SU 1499,854 of Jan. 10, 1996, Kozintseva, T.N.
Database WPI, Section Ch, Week 200277 Derwent Publications Ltd., London, GB: AN 2002/711292 & RU 2,187,478 of Aug. 20, 2002, Tolyattiazot Corp. Stock Co.

*Primary Examiner*—Elizabeth D Wood
(74) *Attorney, Agent, or Firm*—Finnegan, Henderson, Farabow, Garrett & Dunner

(57) ABSTRACT

A metal-phosphate binder is provided. The binder may include an aqueous phosphoric acid solution, a metal-cation donor including a metal other than aluminum, an aluminum-cation donor, and a non-carbohydrate electron donor.

19 Claims, No Drawings

METAL-PHOSPHATE BINDERS

U.S. GOVERNMENT RIGHTS

This invention was made with government support under the terms of Contract No. DE-AC05-00OR22725, subcontract 4000015331, awarded by the Department of Energy. The government of the United States may have certain rights in this invention.

TECHNICAL FIELD

This disclosure pertains generally to metal-phosphate binders, and more particularly, to methods of producing metal-phosphate binders and materials made from such binders.

BACKGROUND

Metal-phosphate binders are used in a number of industrial and non-industrial applications. Such binders may be used to produce adhesives, coatings, and other materials with desired physical, chemical, thermal, and/or electrical properties. For example, such binders may be used to produce adhesives and coatings for high temperature applications or corrosion resistance. In addition, metal-phosphate binders may be used to produce materials that form important structural components of exhaust systems including, for example, catalyst supports and gas absorbers. Further, these binders may be used to produce a variety of useful monolithic, ceramic, and/or composite materials.

In some metal-phosphate binder production processes, the binder is produced by combining one or more metal-ion donors with an electron donor in an acidic solution. However, previously used electron donors may provide slow reactions when used to produce metal-phosphate binder solutions, and as a result, production of useful binders may be very time consuming. In addition, some binder production processes require the use of carbohydrate electron donors, such as sucrose, which may remain in the binder solution after donating electrons. Subsequently, the carbohydrates may be removed by heating, thereby increasing the porosity of the material or otherwise altering the material structure. In some cases, increasing the porosity or other structural properties may produce undesirable changes in material performance.

One method for producing a metal-phosphate binder is described in U.S. Pat. No. 5,620,645, issued to Crumpacker on Apr. 15, 1997 (hereinafter "the '645 patent"). The method of the '645 patent includes mixing chromium oxide with an aqueous ortho-phosphoric acid solution. Common table sugar and alumina are then added, and the mixture is heated while stirring until the reaction is complete. Finally, some of the aqueous solvent may be removed to produce a syrup-like binder.

Although the method of the '645 patent may be used to produce a suitable binder, the method may have several disadvantages. The method of the '645 patent may be time consuming, taking up to twelve hours to produce a batch of binder. In addition, the method of the '645 includes the use of table sugar. Table sugar or table sugar reaction products, which may include one or more carbohydrates, may remain in the binder solution upon completion of the reaction. As described above, the remaining sugar or sugar reaction products may produce undesirable alterations in material structural features. Furthermore, the method of the '645 patent may include the use of one or more metal oxides, which can be volatile at elevated temperatures and may pose certain health risks, including exposure to certain hazardous metal ions.

The present disclosure is directed to overcoming one or more of the disadvantages of the prior art metal-phosphate binders and methods of producing such binders.

SUMMARY OF THE INVENTION

One aspect of the present disclosure includes a metal-phosphate binder. The binder may include an aqueous phosphoric acid solution, a metal-cation donor including a metal other than aluminum, an aluminum-cation donor, and a non-carbohydrate electron donor.

A second aspect of the present disclosure includes a method of producing a metal-phosphate binder. The method includes combining a metal-cation donor including a metal other than aluminum, an aluminum-cation donor, and a non-carbohydrate electron donor in an aqueous phosphoric acid solution.

A third aspect of the present disclosure includes a metal-phosphate material. The material includes a metal-phosphate binder solution and a filler material. The binder solution includes an aqueous phosphoric acid solution, a metal-cation donor including a metal other than aluminum, an aluminum-cation donor, and a non-carbohydrate electron donor.

DETAILED DESCRIPTION

The present disclosure provides metal-phosphate binders and methods for producing such binders. The metal-phosphate binders and methods for producing such binders may be used for a variety of applications. For example, the binders of the present disclosure may provide useful adhesives, coatings, and/or structural materials. Further, binder compositions and processing conditions may be selected to produce numerous different materials having certain physical, chemical, thermal, and/or electrical properties.

Suitable metal-phosphate binders may be produced using a variety of techniques. In one embodiment, a metal-phosphate binder may be produced through a redox mechanism in a suitable solvent. For example, metal phosphate binders may be produced by combining one or more metal-cation donors, a phosphate source, and one or more electron donors in an aqueous ionic solution.

A variety of suitable solvents may be used to produce suitable metal-phosphate binders. For example, in one embodiment, the solvent may include an aqueous phosphoric acid solution. Suitable aqueous phosphoric acid solutions may be produced by dissolving a certain quantity of ortho-phosphoric acid in water. Further, the use of ortho-phosphoric acid will also provide a phosphate ion source for production of a suitable binder.

A variety of metal-cation donors may be used to produce suitable metal-phosphate binders. For example, suitable metal-cation donors may include a variety of metal nitrates, metal oxides, and/or other metal salts. The specific metal-cation donors may be selected based on desired binder properties and/or to produce certain material properties when the metal-phosphate binder is used to produce a material product, such as a coating, adhesive, or structural material. In some embodiments, the metal-cation donors may be selected from a number of suitable metal oxides and metal nitrates. Suitable metal-cation donors may include aluminum hydroxide, aluminum oxide, chromium trioxide ($CrO_3$), nickel nitrate ($Ni(NO_3)_2$), molybdenum trioxide ($MoO_3$), zinc oxide ($ZnO_2$) or any other suitable metal-cation donor.

Selected metal-cation donors may be dissolved in the aqueous acid solution. In some embodiments, combinations of one or more metal cations may be used. For example, in one embodiment, a suitable metal-phosphate binder may include aluminum cations. Further, one or more metal cations other than aluminum cations may be selected. In other embodiments, the one or more other metal cations may be used in combination with a certain amount of aluminum cations.

The amount of each metal cation may be selected to produce binders and materials that have desired properties. For example, in some embodiments, the amount of each metal cation may be selected to produce materials having certain mechanical properties including, for example, a certain strength, hardness, tribologic properties, and/or any other suitable mechanical property. In other embodiments, the metal cations may be selected to produce certain thermal and/or electrical properties. For example, the metal cations may be selected to facilitate production of a coating having a certain electrical or thermal conductivity. The specific electrical or thermal conductivity may be selected to produce a material for use as an insulator, conductor, and/or semiconductor. In other embodiments, specific material compositions may be selected to facilitate production of any other suitable material property including corrosion resistance, heat resistance, or any other desired property.

In some embodiments, the metal-phosphate binder may include a certain amount of aluminum cations. For example, suitable metal-phosphate binder solutions may be produced such that the binder solution includes a source of aluminum cations and, alternatively, one or more additional metal cations. The ratio of aluminum cations to other metal cations may be controlled to facilitate production of a material having desired properties. Suitable metal-phosphate binder solutions may be produced wherein aluminum cations comprise between 20% and 100% of the metal cations in the metal-phosphate binder solution. In some embodiments, the aluminum cations may comprise between about 25%-90%, between about 50%-90%, between about 50%-100%, between about 50%-75%, or between about 75%-90% of the metal cations in the metal-phosphate binder solution.

In some embodiments, the amount of aluminum may be selected to facilitate production of certain material mechanical properties. For example, aluminum cations within a metal-phosphate binder solution may facilitate production of materials having a certain strength, and/or fracture toughness. Therefore, for some applications, increasing the amount of aluminum may produce a material with increased fracture toughness that may withstand certain physical stresses. In some embodiments, a minimum amount of aluminum may be selected to produce a certain fracture toughness. For other applications, these physical properties may not be as important or may be adequately produced through the use of other metal cations, such as titanium.

One or more electron donors may be added to the aqueous solution to facilitate a redox reaction according to the following representative reaction:

$$M(NO_3)_2 + 2H_3PO_4 + Al_2O_3 + CH_3OH \text{ (methanol)} + 2H^+ \rightarrow M^{2+} + 2NO_{2(g)} + 2PO_4^{3-} + 2Al^{3+} + CH_2O_{(g)} \text{ (formaldehyde)} + 5H_2O$$

wherein M represents a metal cation and the electron donor is methanol. As shown, the metal-cation donor is provided as a metal nitrate, and the aluminum-cation donor is provided as alumina. However, as noted previously, a variety of suitable metal-cation donors may be used, including metal oxides or any other suitable cation donor. Further, the aluminum may be provided in any suitable form, including aluminum salts or other oxide structures.

In addition, a variety of suitable electron donors may be used. For example, as shown the electron donor includes a representative alcohol, methanol. However, a number of other alcohols or aldehydes may be selected for the electron donor. For example, suitable electron donors may include ethanol, butanol, acetaldehyde, or acetone. Any suitable electron donor or combination of electron donors may be selected.

In one embodiment, the electron donor may be selected to produce a volatile compound upon reacting with the one or more metal-cation donors. For example, as shown in the above representative reaction, methanol may be converted to formaldehyde, which may evaporate at ambient temperatures. Further, evaporation of formaldehyde may be expedited by heating the solution through externally applied heat or through heat generated by exothermic processes. Evaporation of the volatile reaction products in this way will facilitate removal of the formaldehyde or other reaction by-products.

It should be noted that the reaction components may be combined in sequence or simultaneously. For example, by combining all the reaction products simultaneously, the reaction may proceed quickly, thereby facilitating rapid production processes. In other embodiments, it may be desirable to control the addition of one or more components in order to control the reaction speed, prevent excess heating, or to ensure complete reaction of one or more components.

In some embodiments, the relative concentration of phosphate ions and metal-cations in the binder solution may be controlled to produce suitable binders. For example, for some applications, it may be desirable to use an excess of phosphate ions as compared to metal-cations. Therefore, some binders may include a higher concentration of phosphate ions than metal-cations. For example, in some embodiments, the ratio of phosphate ions to metal cations, including both aluminum cations and non-aluminum cations, will be greater than 1:1. In other embodiments, the ratio of phosphate ions to metal cations will be between about 1:1 and about 1.5:1, between about 1:1 and 2:1, between about 1:1 and about 3:1, between about 1:1 and about 4:1, or between about 1:1 and about 5:1.

Suitable binder solutions may be used to produce a number of different materials, including coatings, adhesives, sealants, and/or structural materials. In some embodiments, such materials may be produced by adding one or more filler materials to a suitable binder solution. The specific filler materials may be selected from a number of suitable fillers. Further, the filler materials may be selected based on a number of factors including, for example, the desired material properties, specific material applications, adhesion with or bonding to other materials, cost, availability, and any other suitable factor.

Fillers may be provided in any suitable form. For example, some fillers may include powders of a variety of metal, ceramic, and/or composite materials. Such powders may have a range of compositions and grit sizes, and the specific composition and grit size may be selected to facilitate formation of a desired material structure.

One suitable filler may include dry fine alumina, such as A-16 alumina made by Alcoa. Alumina powder may facilitate formation of a strong, fracture-resistant material suitable for many different adhesives, coatings, and structural materials. In some embodiments, the alumina powder may comprise a certain fraction of the total filler content. For example, the alumina powder may comprise between about 0% and 100% of the filler content by volume. In some embodiments, the filler may comprise between about 50% and 100%, between about 75% and 100%, or between about 90% and 100% of the filler content by volume. The specific alumina content may be selected based on the desired application, desired material properties, cost, material availability, and any other suitable factor.

In addition, a variety of additives or additional filler materials may be combined with a binder solution to facilitate formation of materials having certain thermal, mechanical, electrical, or chemical properties. For example, small amounts of conductive materials may be used to produce a material having a certain conductivity. Such conductive materials may include, for example, silver, gold, copper, or platinum. In addition, other materials, such as polytetrafluoroethylene (PTFE) or graphite, may be selected to produce materials having low friction coefficients and/or high wear resistance.

Addition of filler materials to a binder solution may increase the solution viscosity, and in some embodiments, the amount of filler may be selected to produce a paste or slurry having a certain viscosity. The viscosity of the paste or slurry may be selected to facilitate application of the material to a desired substrate. For example, for some applications, it may be desirable to produce a very viscous slurry to facilitate production of a thick coating. For other applications, a less viscous slurry may be desired to facilitate application of the material using certain processes, such as spraying or brushing. Further, the slurry or paste viscosity may be controlled by adding or removing water (e.g., by centrifuging or evaporating).

After adding suitable fillers to a binder solution, the material may be applied to a substrate. Suitable substrates may include a variety of different metals, alloys, ceramics, and/or composite materials. For example, suitable substrates may include a variety of machine parts, which may be produced from various steels, ceramics, or other materials. Further, suitable substrates may have a number of shapes and contours, including flat surfaces or more complex surface geometries.

The material may be applied to a suitable substrate using a number of different processes. For example, suitable application processes may include brushing, spraying, dipping, etc. The specific application process may be selected based on the desired material thickness, material viscosity, the type of substrate to which the material is applied, processing costs, production time, and/or any other suitable factor.

After application of the material to a suitable substrate, the material may be cured to facilitate formation of desired structural changes. A variety of suitable curing processes may be selected. For example, the material may be cured at a range of temperatures using various ramp rates and hold times, and the specific curing protocol may be selected to facilitate formation of certain material structural and physical properties, such as porosity, strength, and density.

Typically, materials produced according to the disclosed methods may be cured at temperatures between about 250° C. and about 350° C., but any suitable cure temperature may be used. Further, the rate of heating to the final cure temperature may be selected to produce certain material properties. For example, rapid heating rates may prevent escape of gases contained or produced within the material, thereby producing a porous material. Slower heating rates may facilitate release of gases from the material, thereby producing a denser, stronger material. Typical heating rates may be between about 0.25° C./minute and about 2° C./minute, but any suitable heating rate may be selected based on the desired material structure.

During heating, it may be desirable to hold the temperature at various points to facilitate release of water contained within the material. For example, significant water loss may occur at certain temperatures. For some materials produced with the disclosed binders, significant water loss can occur at about 100° C. and at about 225° C. Therefore, it may be desirable to heat the material to about 100° C. and to hold the material at that temperature for a certain time to facilitate the release of water contained within the material. The material may then be heated to about 225° C. and held at that temperature for a certain time before heating to the final cure temperature. The specific hold time may be selected based on material thickness and water content, but typical hold times may be between about 30 minutes to about 2 hours at each hold temperature.

A range of suitable cure times (i.e., the time the material is held at the final cure temperature) may be selected. The specific cure time may be selected based on a number of factors including, for example, material thickness, material composition, and desired material properties. Typical cure times may be between about 6 hours and about 24 hours, depending on the temperature, material thickness, and material composition. Any suitable curing protocol may be used.

A variety of suitable material structures may be produced using the compositions and methods described. In some embodiments, suitable composite materials may be produced. For example, suitable composites may include one or more filler materials dispersed in a continuous metal-phosphate matrix. The specific composite structure and properties may be produced by selecting a desired composition and processing parameters.

EXAMPLE 1

Production of a Suitable Metal-Phosphate Binder Solution

A suitable metal-phosphate binder may be produced in an aqueous ortho-phosphoric acid solution. First, 0.18 moles alumina ($Al_2O_3$), 0.064 moles $Ni(NO_3)_2$, and 5 mL methanol are added to 50 mL of 85% ortho-phosphoric acid. This mixture is stirred to homogeneity and concurrently heated to approximately 50° C. Under these conditions, the components react by the redox mechanism described above.

As the reaction starts, the heat should be monitored and removed or reduced to maintain a consistent temperature. A vapor, containing primarily a mixture of nitric oxide and formaldehyde, is released from the reaction mixture. The solution should be stirred, and additional methanol is added until vapor formation stops. Cessation of vapor formation indicates that the reaction is complete. In order to keep the water content consistent, the temperature should not exceed 100° C., and it may be necessary to cool the solution if the reaction becomes too vigorous. Once the reaction is complete, the binder solution may be cooled and can be stored in common laboratory containers, such as glass beakers.

Using the reaction conditions described, the resulting product will be an aqueous ionic solution in which substantially all the metal and phosphate components will be dissolved after completion of the reaction. For some applications, it may be desirable to include more or less water. Additionally, it may be desirable to use different quantities of one or more components, including the one or more metal-cation donors. Further, the water content may be monitored and controlled to ensure batch-to-batch consistency.

EXAMPLE 2

Production of an Adhesive

One or more filler components may be added to a suitable binder solution to produce an effective adhesive. Production of a suitable binder solution is described in Example 1, but any suitable binder solution may be used. For example, in one embodiment, a binder solution may be produced as described in Example 1, but molybdenum trioxide may be substituted for nickel nitrate to produce a molybdenum-based binder. Fifty grams of alumina, such as A-16 alumina made by Alcoa, are added to 20 mL of molybdenum-based binder. The combined alumina and binder solution is stirred to form a paste. This paste can then be applied to a clean surface and any unused paste can be stored in a sealed container.

In some embodiments, it may be desirable to cure the adhesive paste after applying it to a suitable surface. The adhesive may be cured using a variety of suitable curing processes, as described previously. As an example, this adhesive may be cured at 300° C. using a 1° C./minute ramp rate. During heating, holds may be instituted at 105° C. and 230° C. for about 30 minutes. The heating rates and cure time will depend on the paste thickness, but typical suitable cure times can be between about 2 hours and about 24 hours. However, the cure time may vary for different compositions and thicknesses.

EXAMPLE 3

Production of an Anti-Corrosive Coating

An anti-corrosive coating can be made using a zinc-based binder. A suitable zinc-based binder may be produced by substituting zinc oxide for nickel nitrate using the method of Example 1. Approximately 25 grams of alumina powder is added to 15 mL of binder and stirred until homogenous. The mixture will form a paste, which may be applied to a suitable substrate.

The coated material should then be cured using a suitable curing process described previously. As noted, the specific curing conditions may be selected based on a variety of factors, such as coating thickness, composition, and desired coating properties.

EXAMPLE 4

Production of a Thermal-Barrier Coating

A protective thermal-barrier coating can be produced by using a chromium-based binder, which may be produced by substituting chromium trioxide for nickel nitrate using the method of Example 1. Fifty grams of alumina, 27 grams of aluminosilicate microspheres, and 5 grams of graphite powder are added to 20 mL binder solution, and the mixture is stirred until homogeneous. A variety of suitable aluminosilicate microspheres may be selected. For example, suitable aluminosilicate microspheres include G-3500 Z-Light Spheres™ produced by 3M™. The mixture may then be applied to any suitable surface and cured.

Once cured, this coating may have excellent heat resistance. For example, this coating may withstand temperatures up to 1200° C. However, various other compositions and curing processes may be selected to produce different degrees of heat resistance. Further, other compositions may be selected to produce coatings having other desired physical, chemical, thermal, and/or electrical properties.

INDUSTRIAL APPLICABILITY

The present disclosure pertains to improved methods for producing metal-phosphate binders. The binders may be used to produce a variety of different materials having a range of physical, chemical, thermal, and/or electrical properties.

The method of the present disclosure includes mixing of a metal-cation donor and an aluminum-cation donor in an aqueous acidic solution. A non-carbohydrate electron donor, such as methanol, is added to the aqueous solution to produce a suitable binder solution. The metal-ion donors and electron donors of the present disclosure may provide a number of advantages.

The electron donors of the present disclosure may provide more chemically favorable reactions. These favorable chemical reactions may be more easily controlled and may provide shorter production times. Consequently, using the methods of the present disclosure, aqueous binder solutions may be produced in a fraction of the time previously required. In some cases, the processing time may be reduced to less than one tenth the time previously needed to make similar binders.

The metal-ion donors of the present disclosure may include metal nitrates and/or metal oxides. Use of metal nitrates may provide a number of advantages over previously used metal oxides. For example, metal nitrates are less volatile and may react less violently than previously used metal oxides. In addition, metal nitrates may release nitrogen dioxide, which can be converted into industrially useful nitric acid. Finally, the metal nitrates of the present disclosure may be more environmentally friendly than some metal oxides, including chromium oxides.

The method of the present disclosure also facilitates the production of better material products with more precisely controlled material properties. Previously used electron donors, including various sugars, may remain in the binder solution after electron donation. These sugars may be trapped within materials or intermediates produced according to the methods of the disclosure. Subsequently, the trapped sugars may be removed by heating, thereby producing potentially unwanted structural changes. In contrast, the electron donors of the present disclosure may form volatile compounds at low temperatures. Therefore, these volatile compounds can be immediately removed from the ionic binder solution after donation of electrons, thereby preventing subsequent structural changes.

It will be apparent to those skilled in the art that various modifications and variations can be made in the disclosed systems and methods without departing from the scope of the disclosure. Other embodiments of the disclosed systems and methods will be apparent to those skilled in the art from consideration of the specification and practice of the embodiments disclosed herein. It is intended that the specification and examples be considered as exemplary only, with a true scope of the disclosure being indicated by the following claims and their equivalents.

What is claimed is:

1. A metal-phosphate binder, comprising:
   an aqueous phosphoric acid solution;
   a metal-cation donor including a metal other than aluminum, wherein the metal-cation donor includes a metal nitrate;
   an aluminum-cation donor; and a non-carbohydrate electron donor including methanol, wherein the methanol is included in a quantity sufficient to reduce substantially all of the metal-cation donor and the aluminum-cation donor.

2. The binder of claim 1, wherein the metal nitrate comprises $Ni(NO_3)_2$.

3. The binder of claim 1, wherein the aluminum-cation donor comprises alumina.

4. The binder of claim 1, wherein the metal-cation donor and aluminum-cation donor are provided in quantities such that the aluminum cations comprise between about 50% and about 100% of the metal cations.

5. The binder of claim 1, wherein the metal-cation donor and aluminum-cation donor are provided in quantities such that the aluminum cations comprise between about 50% and about 75% of the metal cations.

6. The binder of claim 1, wherein the metal-cation donor and aluminum-cation donor are substantially dissolved within the aqueous phosphoric acid solution after reacting with the electron donor.

7. A method of producing a metal-phosphate binder, comprising:
   combining a metal-cation donor including a metal other than aluminum, an aluminum-cation donor, and a non-carbohydrate electron donor in an aqueous phosphoric acid solution;
   wherein the metal-cation donor includes a metal nitrate; and
   wherein the non-carbohydrate electron donor includes methanol, the methanol being provided in a quantity sufficient to reduce substantially all of the metal-cation donor and the aluminum-cation donor.

8. The method of claim 7, wherein the metal nitrate comprises $Ni(NO_3)_2$.

9. The method of claim 7, wherein the aluminum-cation donor comprises alumina.

10. The method of claim 7, wherein the metal-cation donor and aluminum-cation donor are provided in quantities such that the aluminum cations comprise between about 50% and about 100% of the metal cations.

11. The method of claim 7, wherein the metal-cation donor and aluminum-cation donor are provided in quantities such that the aluminum cations comprise between about 50% and about 75% of the metal cations.

12. The method of claim 7, wherein the metal-cation donor and aluminum-cation donor are substantially dissolved within the aqueous phosphoric acid solution after reacting with the electron donor.

13. A metal-phosphate material, comprising:
   a metal-phosphate binder solution, including:
      a metal-cation donor including a metal other than aluminum, wherein the metal-cation donor includes a metal nitrate;
      an aluminum-cation donor; and
      a non-carbohydrate electron donor including methanol, wherein the methanol is included in a quantity sufficient to reduce substantially all of the metal-cation donor and the aluminum-cation donor; and
   a filler material.

14. The material of claim 13, wherein the filler comprises alumina.

15. The material of claim 13, wherein the filler comprises molybdenum oxide.

16. The material of claim 13, wherein the filler comprises zinc oxide.

17. The material of claim 13, wherein the filler comprises aluminosilicate.

18. The material of claim 13, wherein a ratio of phosphate ions and metal cations, including both aluminum cations and non-aluminum cations, in the binder solution is greater that 1:1.

19. The material of claim 13, wherein the material includes a filler material dispersed in a metal-phosphate matrix.

* * * * *